Nov. 20, 1962    R. E. HELTZEL    3,064,832
MOBILE BATCHING PLANT
Filed April 5, 1962    7 Sheets-Sheet 1

INVENTOR
Robert E. Heltzel

BY
Wilkinson, Mawhinney & Theibault
ATTORNEYS

Nov. 20, 1962 R. E. HELTZEL 3,064,832
MOBILE BATCHING PLANT
Filed April 5, 1962 7 Sheets-Sheet 2
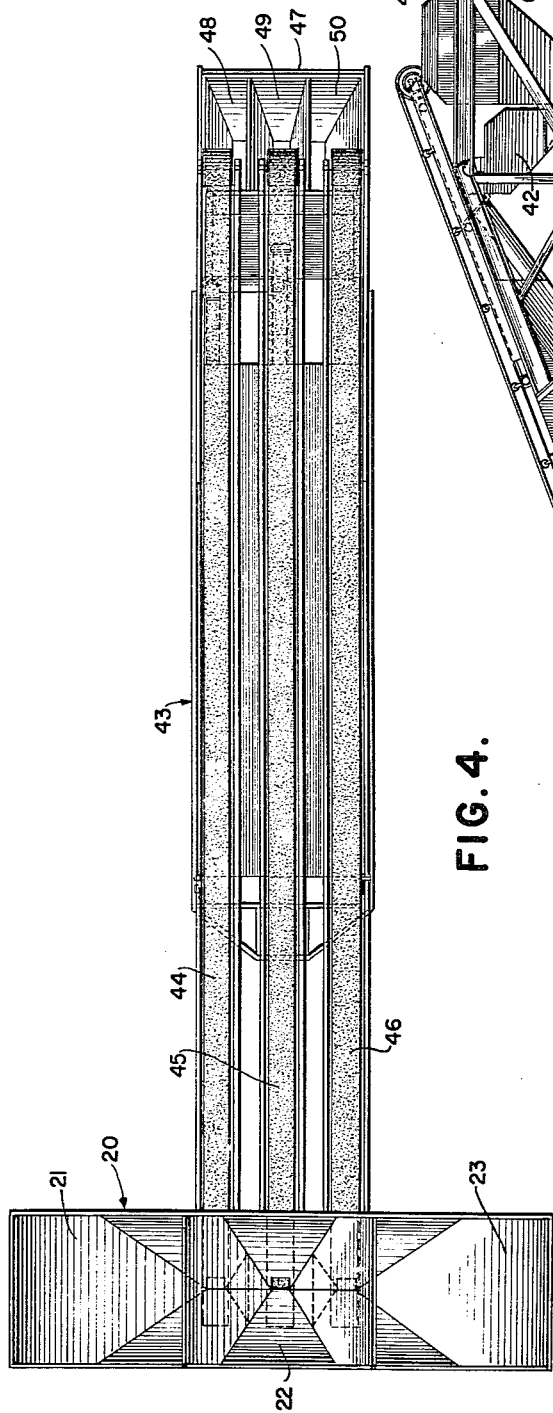
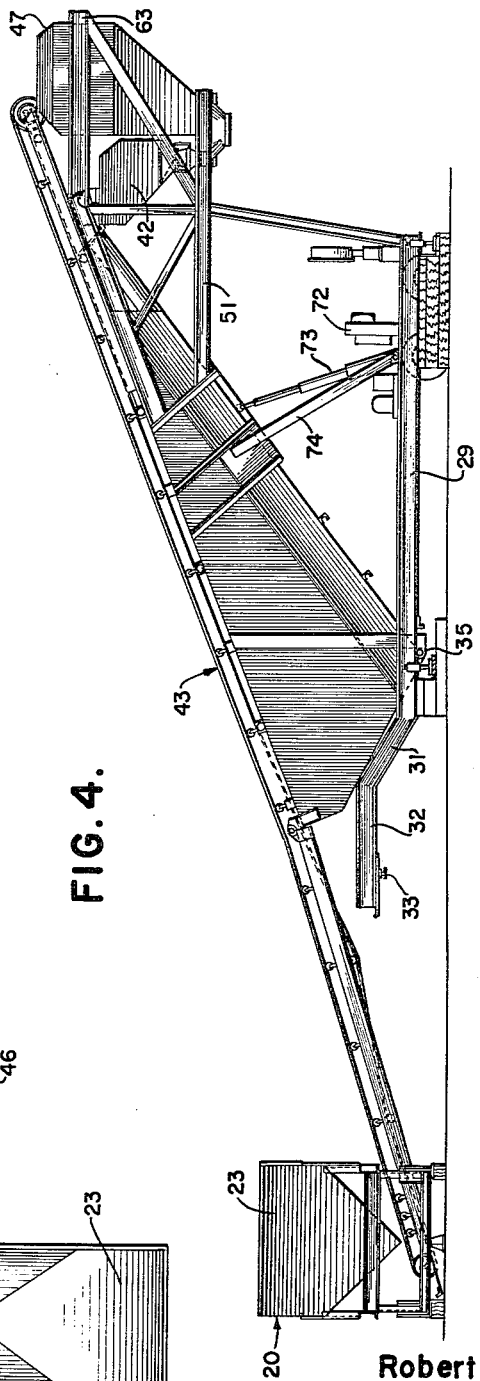
FIG. 3.
FIG. 4.
INVENTOR
Robert E. Heltzel
BY Wilkinson, Mawhinney & Theibault
ATTORNEYS Nov. 20, 1962 R. E. HELTZEL 3,064,832
MOBILE BATCHING PLANT
Filed April 5, 1962 7 Sheets-Sheet 5

INVENTOR
Robert E. Heltzel
BY
Wilkinson, Mawhinney & Theibault
ATTORNEYS

United States Patent Office 3,064,832
Patented Nov. 20, 1962

3,064,832
MOBILE BATCHING PLANT
Robert E. Heltzel, 6922 Mines Road, Warren, Ohio
Filed Apr. 5, 1962, Ser. No. 191,656
17 Claims. (Cl. 214—17)

The present invention relates to mobile batching plant, and is a continuation-in-part of my similarly entitled application, Serial No. 107,101, filed May 2, 1961, now abandoned, and has for an object to provide a self-elevating, high capacity, mobile batching plant capable of uses with ready-mix, dry-batch, and central mix materials.

Another object of the invention is to provide a self-erect mobile batching plant having maximum mobility, high capacity production and speed and economy of erection, the improved batching plant being movable in two units to the job site where the units are spotted and blocked in a relative arrangement with a total erection time of approximately 2¾ hours, without the use of cranes or other operational aids.

A still further object of the invention is to provide a self-contained mobile batching plant having its own machinery for erecting the plant at job site in which the plant is carried by a trailer in a lowered position for over-the-highway transport.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 3 is a side elevational view of the plant comprising both units as set up at the job site in operative condition.

FIGURE 4 is a top plan view of the same.

FIGURE 9 is a fragmentary perspective view of the cement charging hopper for the cement storage bin.

Figure 2:
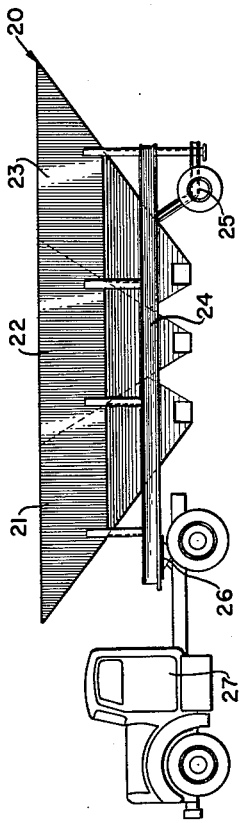
FIGURE 2 is a similar view showing the second unit comprising an aggregate storage bin with wheeled frame also coupled to a truck tractor for over-the-highway transportation.

Referring more particularly to the drawings, in FIGURE 2 an aggregate storage bin unit 20 is illustrated having three separate compartments 21, 22 and 23 mounted upon a frame 24 having a rear supporting wheel assembly 25 and provided at its forward end with a fifth wheel or other detachable connection 26 to a truck tractor 27.

Figure 1:
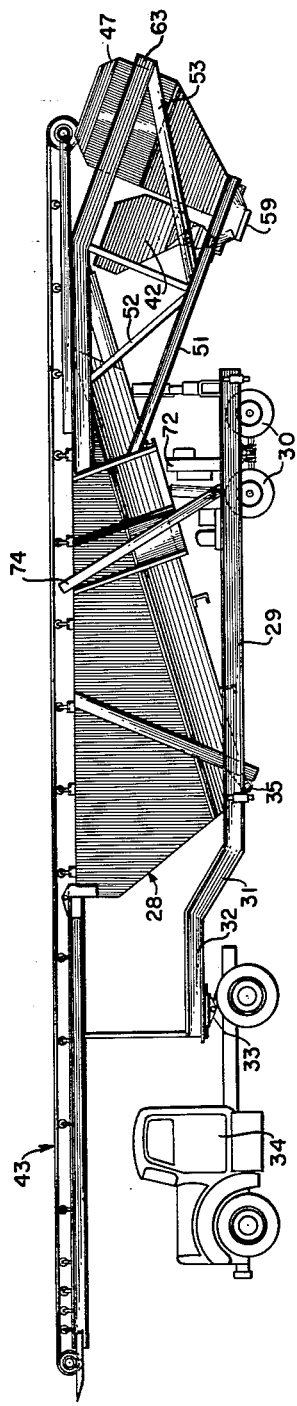
FIGURE 1 is a side elevational view of the main unit in the transport position shown coupled for towing to a truck tractor.

Referring more particularly to FIGURE 1, the main unit is illustrated as mounted upon a frame 29 supported upon tandem-axles rear wheel assembly 30, such frame having diagonal forward sections 31 from which extend forwardly draw bar sections 32 having a fifth wheel or other detachable connection 33 to a truck tractor 34.

This main unit includes generally the cement storage bin 28 and the aggregate conveyor system 43.

This main unit is pivoted on a transverse pivot shaft 35 to the frame 29 at an intermediate point whereby the entire unit may rock in a fore and aft direction on the frame from the positions of FIGURES 1 and 3, FIGURE 1 showing the over-the-highway transport position with the conveyor system 43 extending substantially horizontally and FIGURE 3 showing the erected or set-up condition of the unit at job site.

Figure 5:
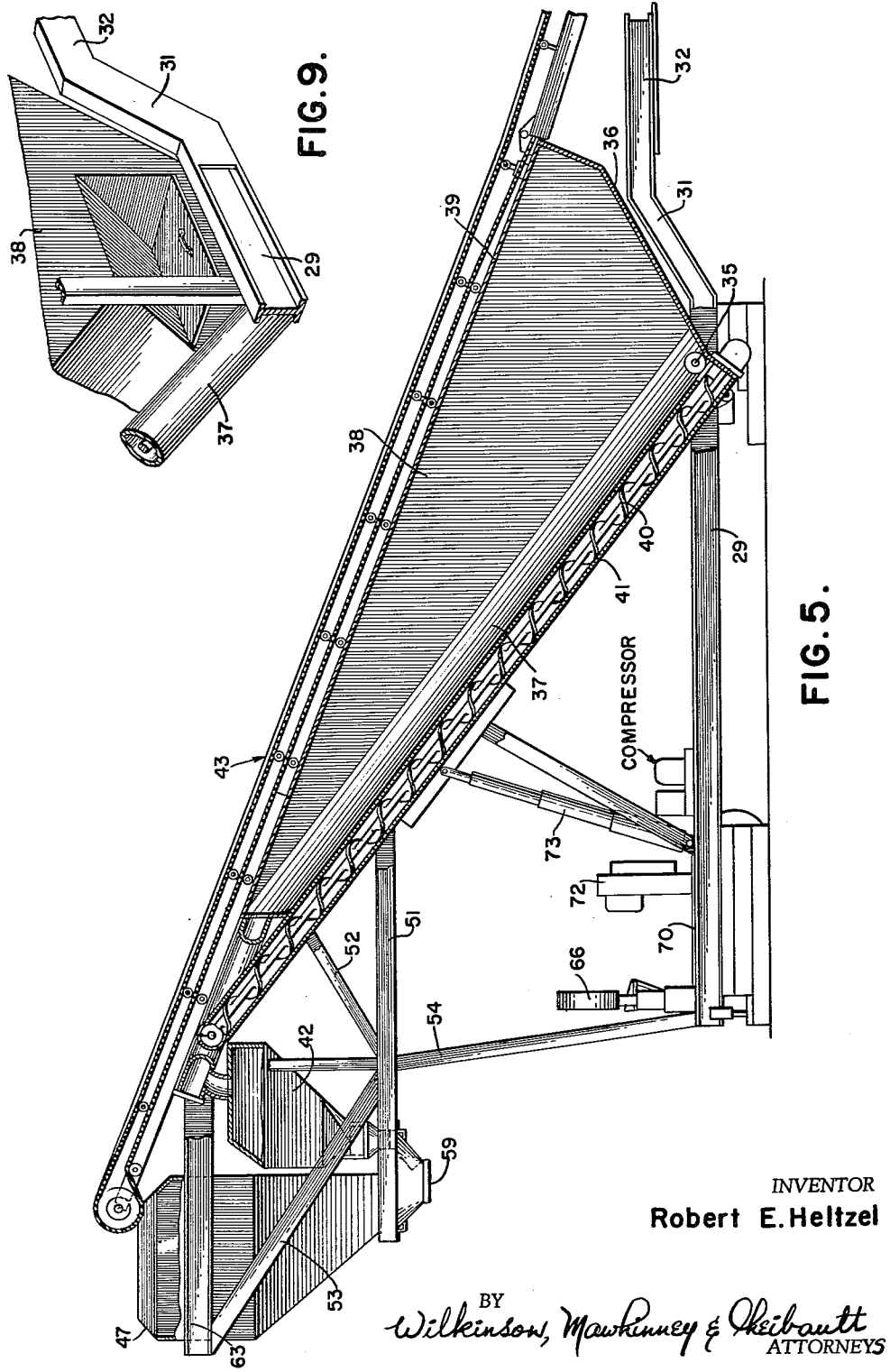
FIGURE 5 is a vertical sectional view with parts broken away showing the main unit in erected position ready for use.

As more particularly shown in FIGURE 5, the cement storage bin is provided with front and rear bottom walls 36 and 37, side walls 38 and a top wall 39. The rear bottom wall 37 is the longer wall and it extends from the pivot 35 at a lesser angle than the front shorter bottom wall 36. In vertical longitudinal section the cement storage bin is triangular, as seen in FIGURE 5. Taken as a whole, it is substantially a pentahedron, the main vertex of which is at the pivot 35 with the top wall 39 forming the hypotenuse.

In the base, preferably to one side of the long sloping rear bottom wall 37 is a screw conveyor 40 contained in a conveyor casing 41 having communication with the interior space of the cement storage bin and at its upper delivery end delivering to a cement batch hopper 42.

The aggregate conveyor system 43 comprises a plurality of separate endless belt charging conveyors 44, 45 and 46, one conveyor being provided for each of the compartments of the aggregate storage bin beneath which the lower end of the conveyors are placed in the erected position of the plant, as shown in FIGURE 3, the aggregate storage bin unit 20 being spotted and blocked transversely across the lines of the two or more belt charging conveyors.

At their upper or rear ends these conveyors 44, 45 and 46 are in delivery relation to a batcher bin 47 having compartments 48, 49 and 50 corresponding with the compartments 21, 22 and 23 of the aggregate storage bin 20.

Various structural members 51, 52, 53 and 54, in combination with the batcher bin support frame 63, serve to support the cement hopper 42 and the batcher bin 47 from the main unit.

Figure 6:
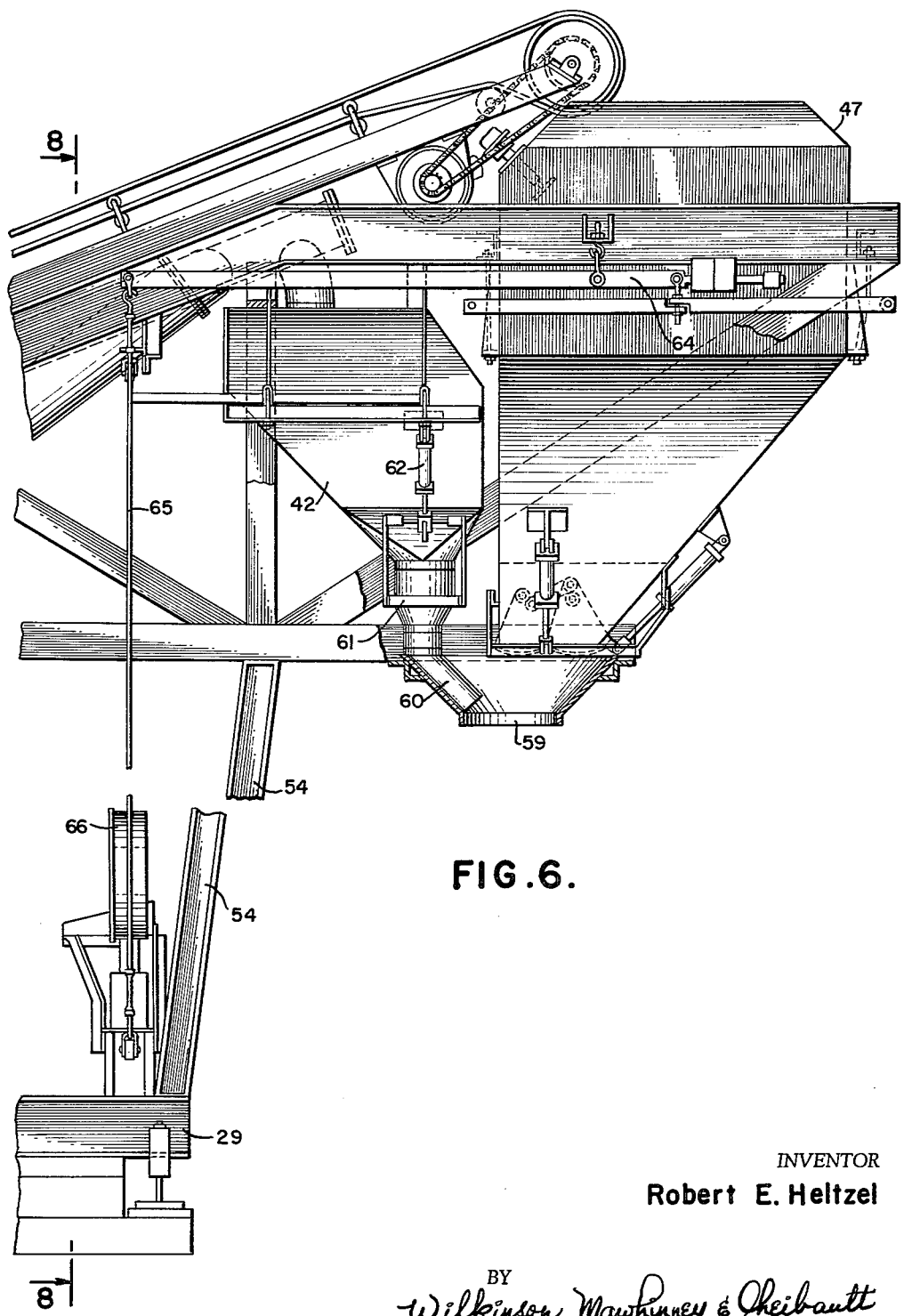
FIGURE 6 is a fragmentary side elevational view with parts broken away and parts shown in section illustrating the cement and aggregate batcher bins in conjunction with the conveyor mechanism and scale features.
Figure 7:
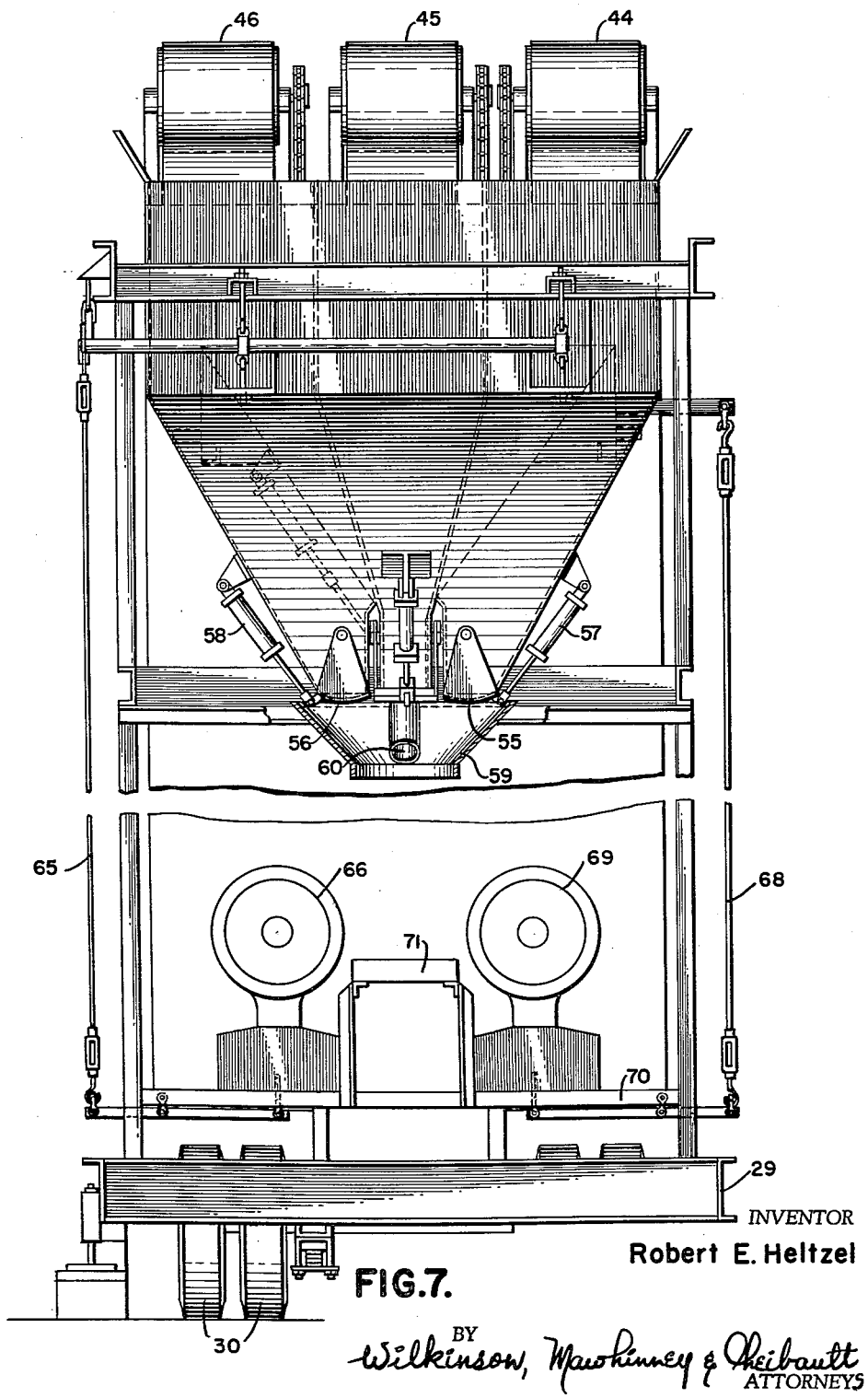
FIGURE 7 is an end elevational view taken from the batcher end of the plant.
Figure 8:
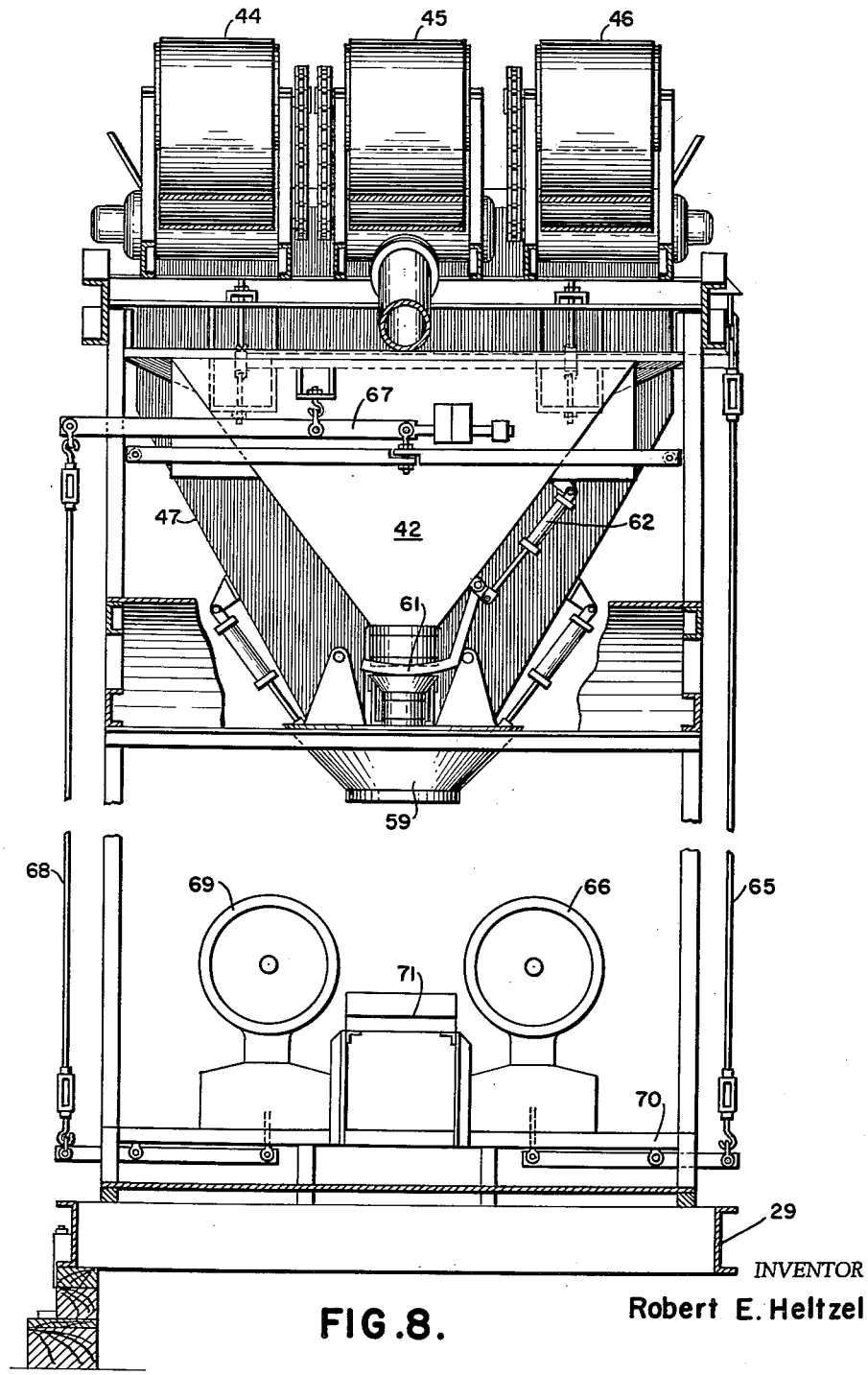
FIGURE 8 is a vertical sectional view taken on the line 8—8 in FIGURE 3.

As shown more particularly in FIGURES 6, 7 and 8, aggregate batching discharge gates 55 and 56 for the compartments of the batcher bin 47 are arranged to be driven by air motors 57 and 58 and these gates discharge into an aggregate mix chute 59 into which cement from the hopper 42 is also delivered through a cement chute 60 as controlled by a cement discharge gate 61 operated by an air motor 62.

As shown more particularly in FIGURES 6 and 7, 64 represents a scale beam for the batcher bin 47 having scale connections 65 to a dial 66.

Figure 10:
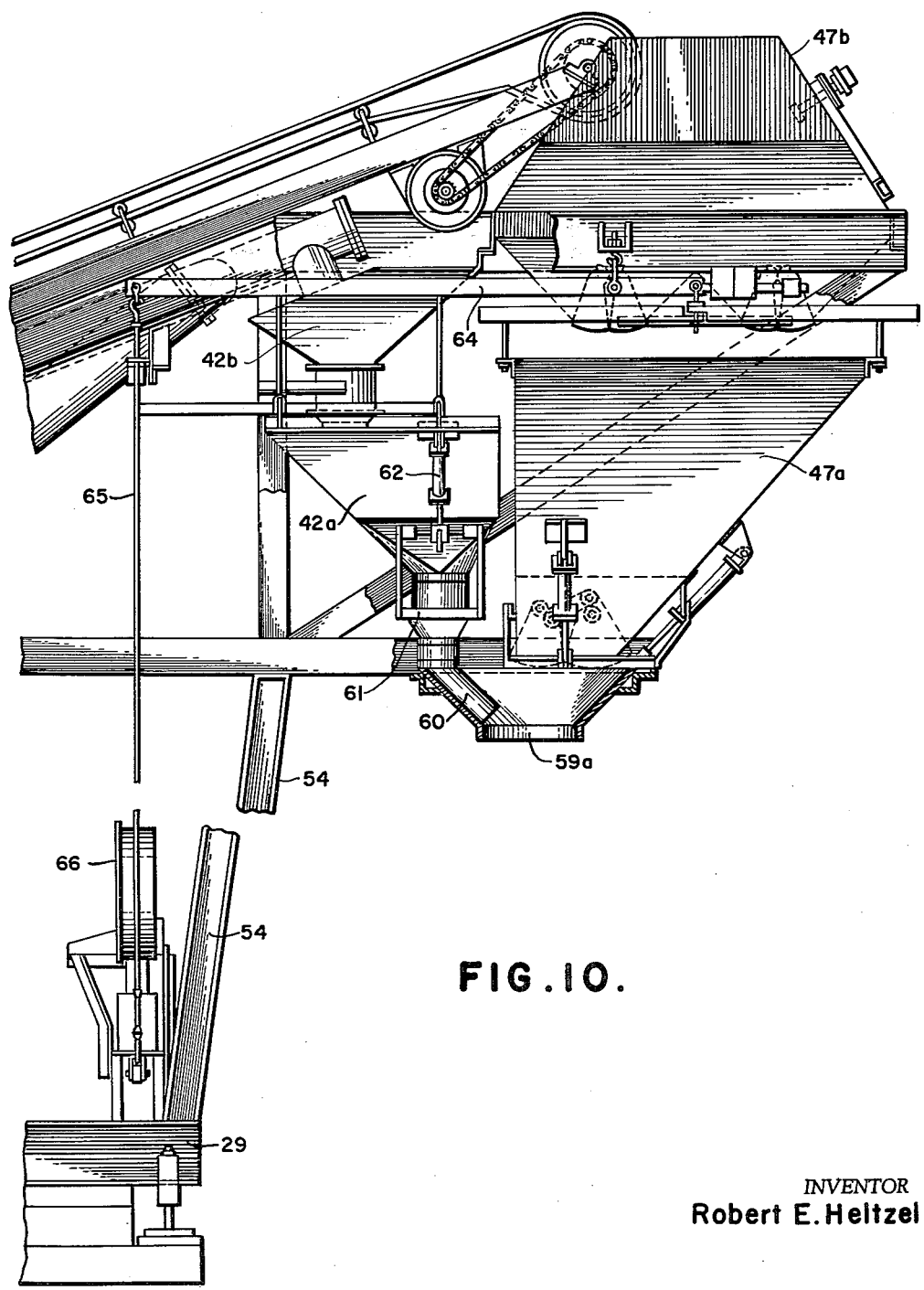
FIGURE 10 is a fragmentary side elevational view with parts broken away and parts shown in section of a modified form of cement and aggregate batching bins in conjunction with surge hoppers employed with the conveyor mechanism and scale features.

As shown more particularly in FIGURE 10, a cement weigh hopper 42$^a$ and an aggregate weight hopper 47$^a$ are provided with cement surge hopper 42$^b$ and aggregate surge hopper 47$^b$ which receive materials from the cement screw conveyor 40 into surge hopper 42$^b$ and from the aggregate conveyors 43 into surge hopper 47$^b$. The weighing scales and associated hoppers 42$^a$ and 47$^a$ are then charged from the respective surge hoppers 42$^b$, 47$^b$ and weighing is on a cumulative basis rather than the heretofore described retrogressive system. The discharge mouths of the two weigh hoppers 42$^a$ and 47$^a$ are led to a common mixing chute 59$^a$ where they are admixed and dumped into the mixing plant or truck placed beneath the mouth of the discharge chute 59$^a$.

This modified form of the invention permits direct weighing and eliminates any surges incident to the conveyor systems, either cement or aggregate systems, charging the surge hopper.

In accordance with this modified form of the invention the ground storage bin can be charged, using the belt conveyors 44, 45 and 46 to charge the surge hoppers 42ᵇ and 47ᵇ into the weigh batchers 42 and 47 respectively, all taking place simultaneously.

When the material is weighed and the batch is being discharged through the chute 59ª into the mixer, material can still be charged into the surge hoppers 42ᵇ, 47ᵇ and material can be charge into the ground loading hopper 23. As soon as the batchers 42ª, 47ª are completely discharged, they can immediately be reused for the purpose of weighing the next batch. In other words, at peak operating conditions one can be continuously charging the ground hoppers; the ground hoppers can be continuously charging the belt conveyors which in turn charge the surge hoppers 42ᵇ, 47ᵇ and material from the surge hoppers 42ᵇ, 47ᵇ can be charging the weigh batchers 42ª and 47ª at all times other than when the weigh batcher is discharging material to the mixer. However, the batcher is in use 100% of the time since one use of the batcher is to be certain that all the materials originally weighed into the units have been completely discharged from it.

As shown more particularly in FIGURE 8, a scale beam 67 for the cement batcher hopper 42 has scale connections 68 to the dial 69. The dials 66 and 69 are disposed on an operator's platform 70 on which also is contained the console 71 for convenience between the dials. The platform also carries the self-contained air and hydraulic compressors and pumps 72 which operate the various air motors under controls on the console and also control the delivery of hydraulic pressure to a three-stage hydraulic ram or motor 73.

At the job site various structural members may be added to support the parts in the elevated position including struts 74.

The weight distribution of the mechanical load of the main pivotal unit is such that the center of mass or the center of gravity thereof will pass to the rear of a vertical line through the pivot point 35 in the lower transport position of the parts as shown in FIGURE 1; but will shift to the front side of such vertical line when the parts are erected into the job site position of FIGURE 3, this movement being achieved by the hydraulic motor 73.

In this way the main unit will tend to remain by gravity in the positions to which shifted.

This feature is contributed to by the particular formation of the cement storage bin 28. Although this storage bin will ordinarily be transported empty, in practice there will be residual quantities of the cement in the bin on completion of a job which may then be transported in the bin to a subsequent job site. Therefore, in addition to the mechanical load of the various parts a cement load is often a factor. The bin 28 has, therefore, been so constructed that the deepest (vertically) part of the bin is approximately at the area of pivotal movement so that leverage in erecting or lowering the main unit about the pivot 35 will not be a large factor. The abrupt forward short wall 36 is in the lowered position of FIGURE 1 will tend to cause any residual cement to be deflected toward the pivot area 35 and the same will be true but to a lesser extent of the erected position shown in FIGURE 5.

The long inclined bottom wall 37 will have a similar tendency although because of its angle with the pivot 35 and with its companion bottom wall 36 such action will be to a lesser degree particularly in the position of FIGURE 1, but it will be substantial in the operative position of FIGURE 5. Therefore, the pentahedron form of the cement storage bin 28 is material to the convenience and facility and economy of operation of the main unit in its rocking movement from lowered to erected positions, and vice versa.

The conveyors 44, 45 and 46 may be driven in any suitable manner under controls at the console 71. These conveyors are shown to be chain driven in FIGURES 6, 7 and 8.

With a plant of this construction, when batching is finished on one job the plant can be taken down, moved and set up again ready to load and batch in approximately 5½ hours, plus travel time, without the use of cranes or other costly erection equipment.

When set up connections are made to 220- or 440-volt power source and water line. Thereupon power may be turned on and the hydraulic valve opened to the hydraulic motor 73 whereby this self-contained unit begins to elevate to the operative elevation. The cement storage capacity may be as high as 350 barrels of bulk or bag cement which is charged through loading hopper on the side of the bin which will accommodate standard bulk cement trucks or may be charged by either railroad car or bulk truck air loading system. The built-in screw conveyor 40 unloads the bin, recirculates cement and charges the batcher. The aggregate storage bin 20 may be charged by any conventional method.

Two or three or more separate charging conveyors may be provided depending on plant type and capacity. When weighing retrogressively, all aggregates are charged into batcher simultaneously. Aggregates are charged in sequence when weighing accumulatively.

The flat tank top 39 in the geometrical construction of the cement bin performs a dual function in not only acting as a support for the aggregate conveyors 43 but when the tank is rocked about its pivot 35 for the over-the-highway transportation position shown in FIGURES 1 and 2 the flat top provides a minimum clearance or in fact a ceiling for the structure above which there are no extensions thereby reducing the vertical height of the unit in transit.

The sloping wall containing the cement feed screw 40 is situated at an angle to permit maximum flow of cement and the angle of the top wall 39 is selected at the optimum angle for elevation of the aggregates.

As shown in FIGURE 9 the cement bin may be charged by raising a hinged cover in a notched-out bottom portion of the cement tank.

Although I have disclosed herein the best forms of the invention known to me at this time, I reserve the right to all such modifications and changes as may come within the scope of the following claims.

What I claim is:

1. A mobile batching plant comprising
   (a) a base frame having means by which it may be moved from one site to another,
   (b) a rocker unit pivotally mounted to the frame for rocking movement between transport and erect positions,
   (c) a cement storage bin of varying depth having its greatest depth at approximately the pivot area in the unit,
   (d) aggregate conveyor means carried by the unit in a generally horizontal position for transport and movable to an inclined position when the unit is erected,
   (e) cement conveyor means on the unit in communication with the cement storage bin, and
   (f) cement and aggregate batchers supported on and movable with the unit in position to receive cement and aggregate from the conveyor means by gravity flow when the plant is in the erect position.

2. A mobile batching plant as claimed in claim 1 in which
   (g) the cement storage bin has front and rear inclined bottom walls converging to the pivotal area.

3. A mobile batching plant as claimed in claim 1 in which
   (g) the cement storage bin is of generally triangular form in vertical section comprising a top wall which is the long side, and downwardly convergent side walls which together constitute the bottom of the bin, the locus of the angle between the side walls being substantially in the pivotal area.

4. A mobile batching plant as claimed in claim 1 in which
(g) the cement bin considered as a geometrical figure is substantially a pentahedron composed of two upwardly divergent bottom walls from the pivotal area, two substantially triangular side walls and a long side top wall.

5. A mobile batching plant as claimed in claim 1 in which
(g) the cement bin includes at least in part long and short upwardly divergent bottom walls from the pivotal area with the long bottom wall elevated and the short bottom wall lowered incident to the erected position of the rocker unit.

6. A mobile batching plant as claimed in claim 1 in which
(g) the cement bin at least in part comprises bottom walls downwardly convergent to the pivotal area resulting in the greatest depth of concentration of the cement at and above the pivot axis.

7. A mobile batching plant as claimed in claim 1 in which
(g) the cement bin comprises at least in part short and long bottom walls convergent to the pivotal area with the batchers supported on the long wall end of the unit, further comprising means for elevating the long wall end of the unit.

8. A mobile batching plant as claimed in claim 1 in which
(g) the center of mass of the unit structurally and from a load standpoint is close to the pivotal area in either position of the unit.

9. A mobile batching plant as claimed in claim 1 in which
(g) the center of gravity of the unit loaded or unloaded incident to its rocking motion shifts from one side to the other of the pivotal area to bias the mechanical or mechanical-cement load to either the transport or erect positions.

10. A mobile batching plant as claimed in claim 1 in which
(g) said aggregate conveyor means comprises a plurality of separate conveyors separately taking loads from separate sources of different aggregate supplies and delivering such loads separately to separate compartments of the aggregate batchers.

11. A mobile batching plant as claimed in claim 10 in which
(h) the separate sources comprise an aggregate storage bin unit having plural compartments and further comprising
(i) a wheeled frame for the storage bin unit having means by which it may be towed to the job site independently of the rocker unit, spotted and blocked relatively to the rocker unit to deliver separately to the separate aggregate conveyors.

12. In combination, at least two units equipped for separate over-the-road transport,
(a) one such unit comprising an aggregate storage bin having a plurality of compartments containing differing types aggregate,
(b) a wheeled frame for the bin,
(c) a truck tractor releasably coupled to the frame,
(d) another such unit comprising separate conveyors having receiving ends adapted for insertion separately below the compartments of the storage bin;
(e) a wheeled frame for the conveyors,
(f) a rock unit on the last-named frame carrying the last-named conveyors in a normally substantially horizontal position for transport and rockable to a diagonal position with an elevated delivery end,
(g) means for rocking the rock unit to the diagonal position,
(h) batch means carried on the rock unit having separate compartments positioned to receive the aggregate from the conveyors,
(i) a truck tractor releasably coupled to the rock unit,
(j) a cement storage bin in the rock unit,
(k) a cement batch hopper on the unit, and
(l) a cement screw conveyor accessible to the cement storage bin and to the cement batch hopper.

13. A mobile batching plant comprising
(a) a base frame having means by which it may be moved from one site to another,
(b) a rocker unit pivotally mounted to the frame for rocking movement between transport and erect positions,
(c) a cement storage bin in the unit,
(d) aggregate conveyor means carried by the unit in a generally horizontal position for transport and movable to an inclined position when the unit is erected,
(e) cement conveyor means on the unit in communication with the cement storage bin,
(f) cement and aggregate surge hoppers supported on and movable with the unit in position to receive cement and aggregate from the conveyor means, and
(g) cement and aggregate weigh batchers supported on and movable with the unit in position to receive cement and aggregate from said cement and aggregate surge hoppers and to discharge said cement and aggregate weighed therefrom by gravity flow when the plant is in the erect position.

14. A mobile batching plant as claimed in claim 13 in which
(h) the cement bin considered as a geometrical figure is substantially a pentahedron composed of two upwardly divergent bottom walls from the pivotal area, two substantially triangular side walls and a long side top wall.

15. A mobile batching plant as claimed in claim 13 in which
(h) the cement bin includes at least in part long and short upwardly divergent bottom walls from the pivotal area with the long bottom wall elevated and the short bottom wall lowered incident to the erected position of the rocker unit.

16. A mobile batching plant as claimed in claim 13 in which
(h) the cement bin at least in part comprises bottom walls downwardly convergent to the pivotal area resulting in the greatest depth of concentration of the cement at and above the pivot axis.

17. A mobile batching plant as claimed in claim 13 in which
(h) the cement bin comprises at least in part short and long bottom walls convergent to the pivotal area with the batchers supported on the long wall end of the unit, further comprising means for elevating the long wall end of the unit.

References Cited in the file of this patent

UNITED STATES PATENTS

| | | |
|---|---|---|
| 2,271,434 | Johnson | Jan. 27, 1942 |
| 2,310,592 | Noble | Feb. 9, 1943 |
| 2,347,437 | Saxe | Apr. 25, 1944 |
| 2,606,676 | Dempster | Aug. 12, 1952 |